United States Patent
Klaren et al.

(10) Patent No.: US 12,228,916 B2
(45) Date of Patent: Feb. 18, 2025

(54) AUTONOMOUS INSTRUMENT MANAGEMENT

(71) Applicant: Honeywell International Inc., Charlotte, NC (US)

(72) Inventors: Winfried Klaren, Klundert (NL); Prabhu Soundarrajan, Dublin, CA (US)

(73) Assignee: Honeywell International Inc., Charlotte, NC (US)

( * ) Notice: Subject to any disclaimer, the term of this patent is extended or adjusted under 35 U.S.C. 154(b) by 4 days.

(21) Appl. No.: 17/447,091

(22) Filed: Sep. 8, 2021

(65) Prior Publication Data
US 2023/0070826 A1    Mar. 9, 2023

(51) Int. Cl.
G05B 19/418    (2006.01)

(52) U.S. Cl.
CPC ........... G05B 19/41865 (2013.01); G05B 2219/34242 (2013.01)

(58) Field of Classification Search
None
See application file for complete search history.

(56) References Cited

U.S. PATENT DOCUMENTS

| | | | |
|---|---|---|---|
| 7,797,062 B2 * | 9/2010 | Discenzo | H04L 67/12 700/20 |
| 8,903,750 B1 * | 12/2014 | Bodkin | G06N 7/01 706/14 |
| 9,483,342 B2 | 11/2016 | Hoefig | |
| 9,645,575 B2 * | 5/2017 | Watson | G06N 7/005 |
| 10,678,196 B1 * | 6/2020 | Al-Turki | G05B 13/0265 |
| 10,678,233 B2 * | 6/2020 | Cella | G06N 3/043 |
| 10,740,168 B2 | 8/2020 | Kowta et al. | |
| 10,754,721 B2 | 8/2020 | Horrell et al. | |
| 2003/0184155 A1 * | 10/2003 | Crombez | B60T 13/66 303/152 |
| 2004/0225475 A1 | 11/2004 | Johnson et al. | |
| 2005/0015217 A1 * | 1/2005 | Weidl | G05B 17/02 702/185 |
| 2009/0055684 A1 * | 2/2009 | Jamjoom | G06F 11/0709 714/26 |

(Continued)

FOREIGN PATENT DOCUMENTS

| | | |
|---|---|---|
| CN | 106598791 B | 4/2017 |
| EP | 3059676 A1 | 8/2016 |

OTHER PUBLICATIONS

Extended European Search Report mailed Jan. 30, 2023; issued in connection with corresponding EP Application No. EP22191592.9 (14 pages total).

*Primary Examiner* — Jason Lin
(74) *Attorney, Agent, or Firm* — John Maldjian, Esq.; Stevens & Lee PC

(57) ABSTRACT

One embodiment includes a monitor module for a first device, wherein the first device is configured to obtain measurement data from a second device, to compare the measurement data to a reference value, and to send a signal when the measurement data in comparison to the reference indicates an error condition. Machine learning can be used, where a head-end is capable of modifying the second device when the reference value so indicates. This enables various embodiments to fix the second device without human intervention.

19 Claims, 5 Drawing Sheets

(56) References Cited

U.S. PATENT DOCUMENTS

| | | | |
|---|---|---|---|
| 2009/0204237 A1* | 8/2009 | Sustaeta | G06Q 10/04 |
| | | | 700/106 |
| 2015/0148919 A1* | 5/2015 | Watson | E21B 41/0092 |
| | | | 700/31 |
| 2017/0090434 A1* | 3/2017 | Katsuki | G05B 13/0265 |
| 2017/0336775 A1* | 11/2017 | Tokorozuki | G05B 19/4184 |
| 2018/0267499 A1* | 9/2018 | Tsuneki | G06N 20/00 |
| 2018/0284758 A1* | 10/2018 | Cella | H04B 17/23 |
| 2019/0121348 A1* | 4/2019 | Cella | G05B 19/4185 |
| 2020/0312122 A1* | 10/2020 | Carter | G06F 11/0766 |

* cited by examiner

AUTONOMOUS INSTRUMENT MANAGEMENT

CROSS-REFERENCE TO RELATED APPLICATIONS

None

BACKGROUND

Autonomous instrument management is used by a variety of industries to achieve a production level of consistency, economy, and safety which could not be achieved purely by human manual control. It is implemented widely in industries such as oil refining, pulp and paper manufacturing, chemical processing and power generating plants. For example, an instrument management system can sit in proximity to a plant and can manipulate a valve, start a motor, alter the settings of a device or sensor, or run a chiller or mixing unit as needed.

Instrument management systems can also diagnose faults to prevent an unmanaged problem. An instrument management system can monitor a number of measuring devices to ensure their values are within an expected range for the device whose operation it is taking measurements of, for example. The measuring devices can obtain real-time values during operation of the process it is controlling. This can include, for example, temperature readings, pressure readings, gas flow readings, and the like. Instrument management systems can also report a status of a device or process it controls. This can include, for example, that a device is: out of fiscal reading; out of range; has a device error; and others.

Determining the root cause of an error in a device is a complex and time-consuming task that requires deep knowledge and experience. Highly-skilled and trained technicians are usually required and are typically expensive and in short supply. What is needed is an instrument management that is capable of handling some portion of the faults in its controlled system without human intervention. This will not only make the system more cost-effective, but also reduce the downtime and increase the reliability of the entire system.

SUMMARY OF THE INVENTION

Figure 1:
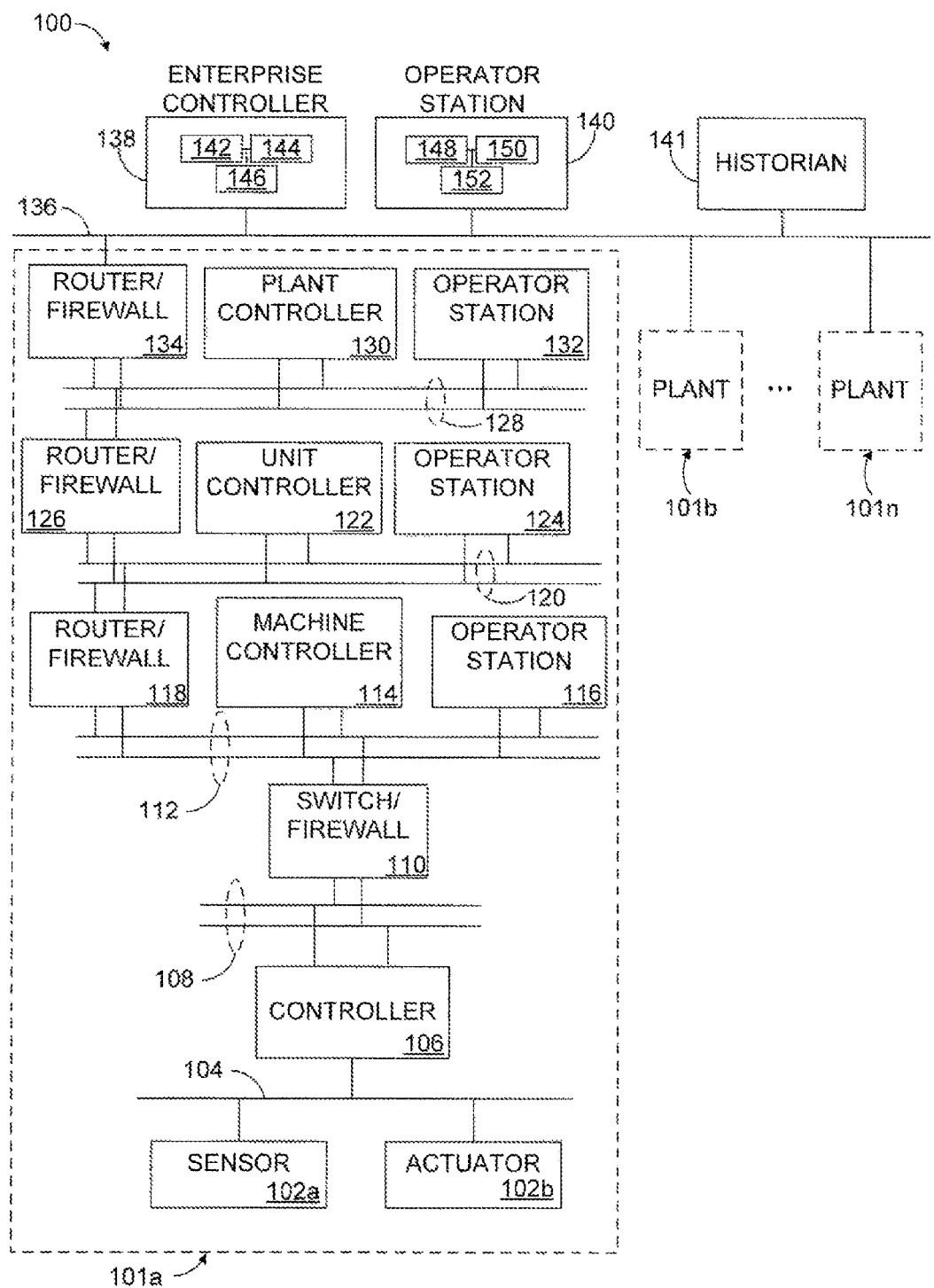
FIG. 1 is a diagram of an autonomous instrument management system according to one embodiment.

One embodiment is an instrument management device, which includes a monitor module for a first device, wherein the first device is configured to obtain measurement data from a second device, to compare the measurement data to a reference value, and to send a signal when the measurement data in comparison to the reference indicates an error condition, a recommendation module to receive the signal from the monitoring module, to analyze the signal, and to generate one or more recommendations associated with the error condition by using a cause and effect module, the cause and effect module comprising a data structure having at least one row and at least one column, the recommendation module accessing a data item from one of the rows or one of the columns of the cause and effect module, a ticket generation module to receive the one or more recommendations including the data item, to obtain a resolution of the error condition by altering a state of the second device, and to generate a data package associated with the resolution of the error condition, and a machine learning module configured to use the package to determine whether to update the cause and effect module, and if so altering the data item in one of the rows or one of the columns.

Another embodiment is a system, which includes a monitoring system for a first device, wherein the first device is configured to obtain measurement data from a second device, to compare the measurement data to a reference value, and to send a signal when the measurement data in comparison to the reference indicates an error condition, a recommendation system to receive the signal from the monitoring system, to analyze the signal, and to generate one or more recommendations associated with the error condition by using a cause and effect table, the cause and effect table comprising a data structure having at least one row and at least one column, the recommendation system accessing a data item from one of the rows or one of the columns of the cause and effect table, a ticket generation system to receive the one or more recommendations including the data item, to obtain a resolution of the error condition by altering a state of the second device, and to generate a data package associated with the resolution of the error condition, and a machine learning system configured to use the package to determine whether to update the cause and effect table, and if so altering the data item in one of the rows or one of the columns.

In another embodiment, a method comprises obtaining measurement data from a device, comparing the measurement data to a reference value, receiving a signal when the measurement data in comparison to the reference value indicates an error condition, using a cause and effect table to generate one or more recommendations associated with the error condition by, the cause and effect table comprising a data structure having at least one row and at least one column, the step of using further comprising accessing a data item from one of the rows or one of the columns of the cause and effect table, obtaining a resolution of the error condition by altering a state of the device, generating a data package associated with the resolution of the error condition, and using the package to determine whether to update the cause and effect table, and if so altering the data item in one of the rows or one of the columns.

DETAILED DESCRIPTION OF THE INVENTION

FIG. 1 illustrates an example autonomous instrument management system 100 according to this disclosure. As shown in FIG. 1, the system 100 includes various components that facilitate production or processing of at least one product or other material. For instance, the system 100 is used here to facilitate control over components in one or multiple plants, shown in FIG. 1 as 101*a*, 101*b*, and 101*n* (referred to hereinafter as 101*a*-101*n*). Each plant 101*a*-101*n* represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, volume, or flow rate and could include such instruments as ultrasonic flow meters, turbines, orifices, Coriolis, gas chromatographs, P&T transmitters, flow computers, and the like. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. The sensors and actuators may be generally referred to as field devices.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/ firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (IVIES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

Figure 2:
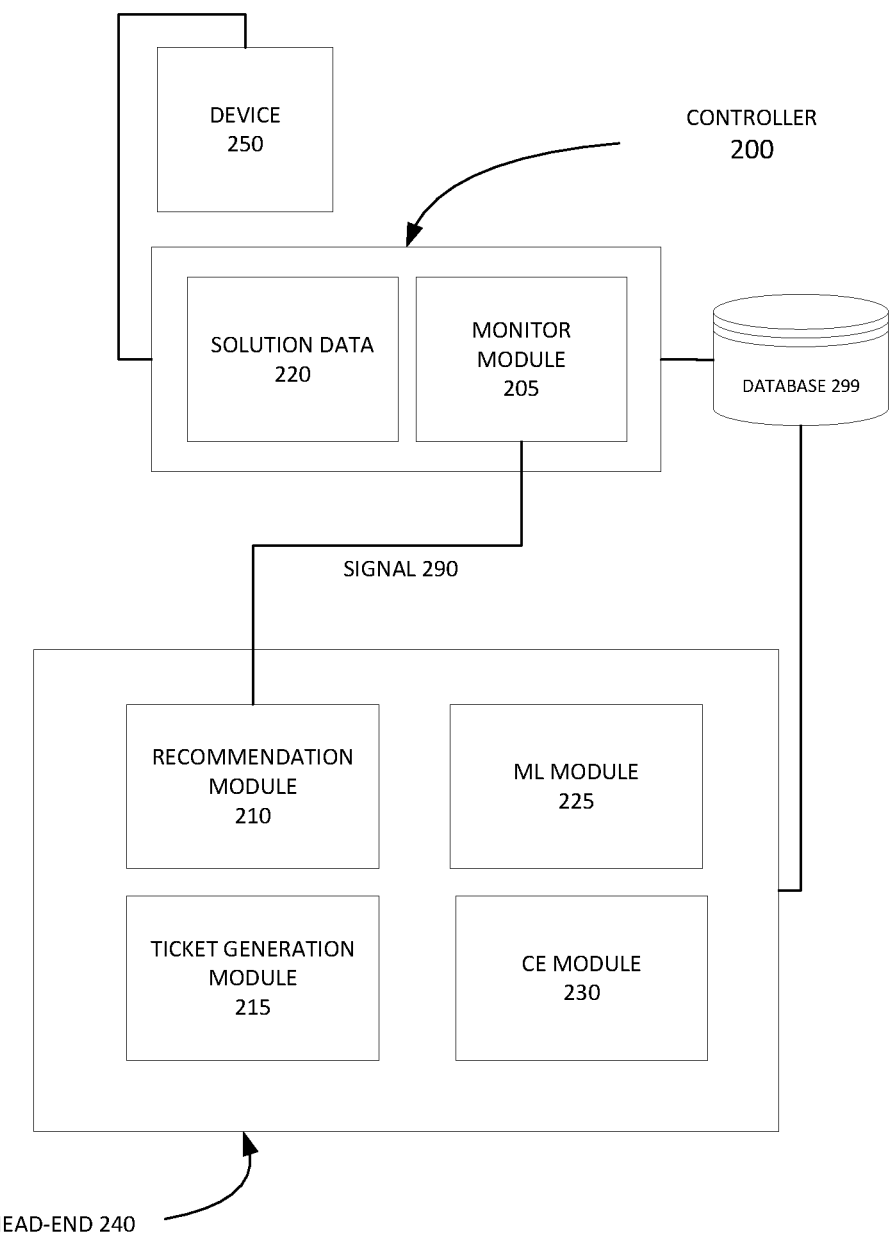
FIG. 2 is a diagram of an autonomous instrument management system according to another embodiment.

FIG. 2 illustrates another example of an autonomous instrument management system. FIG. 2 includes a controller 200 which can be any suitable controller, such as those described with respect to FIG. 1 or others. In one example, the controller 200 is configured to monitor the state, condition, or other aspect of a device 250. The device 250 can be any suitable device that can facilitate production or processing of at least one product or other material. In one example, this includes a gas-flow meter or an ultrasonic transducer. In another example, the controller 200 can use a head-end 240 to provide automated error-correction, service recommendations, and other functionality based on analytics provided by the head-end 240. The device 250 can be any suitable device that has a microprocessor and is capable of storing bulk data and/or performing analytics on the bulk data. In one example, the device 250 is a measuring device, such as a volume and/or mass flow measuring device or meter.

In operation, the controller 200 monitors the device 250 using a monitor module 205. The monitor module 205 continually receives measurement data from the device 250 and compares the measurement data to a reference value. This could be, for example, a volume flow meter reporting a volume measurement to the monitor module 205 and the monitor module comparing the volume measurement to measurement data that represents a normal operating range. The measurement data can be stored in a database 299, or other suitable storage mechanism such as hardware, software, firmware, or any suitable combination of these. When the measurement data and the reference values indicate that the device 250 is operating out of range, or otherwise is in a state that requires some action, a signal 290 is sent to a recommendation module 210. This could happen when an ultrasonic transducer of the device 250 has a reference value indicative of a reduced accuracy. Alternatively, this situation can occur when any generic sensor, instrument, or device is operating out of range when compared to an expected reference value.

The recommendation module 210 can access solution data 220, where it is configured to provide a solution to the monitor module 205 and is capable of enabling the controller 200 to bring the device 250 back into range or otherwise restore its normal operating characteristics. A ticket generation module 215 can also be used, which is configured to perform a process that resolves the error condition that caused the origination of the ticket. The ticket generation module 215 can be configured to receive the signal 290 from the recommendation module 210. In one example, the controller 200 encaplsulates the data associated with the error condition into a package and sends it to the head-end 240. A package can be included on a per device basis and can also be sent with a pre-defined delay, which can allow the system to stabilize on the error situation before sending it to the ticket generation module 215. For example, in the case of a short-lived disturbance that simply disappears, no package may need to be sent. It is also possible that multiple errors and warnings occur based on one error situation. (e.g., a broken sensor cable will result in many different errors), in which case the package could include the multiple errors, or multiple packages can be sent. In another example, the package includes detailed device information collected by the controller 200, like name and serial number of the device, location, log (raw data) files, recommendation text, and more.

The head-end 240 is configured to receive the package and to perform machine learning using the package with a machine learning module 225. A cause and effect module 230 can also be included in the head-end 240. The cause and effect module 230 can have a table of other data structure that pairs a cause of a problem with a solution to the problem. By utilizing the machine learning module 225 continually over time, the cause and effect module 230 can be updated, for example as better solutions are learned to existing problems. In one example, the cause and effect module 305 is configured to have one or more of any active status, alarm, and warning messages for the device 250. In this manner, the machine learning module 225 improves the cause and effect table 230 over time and this will in turn improve the performance of the controller 200, the recommendation module 210 and can be used to improve the solution data 220.

Figure 3:
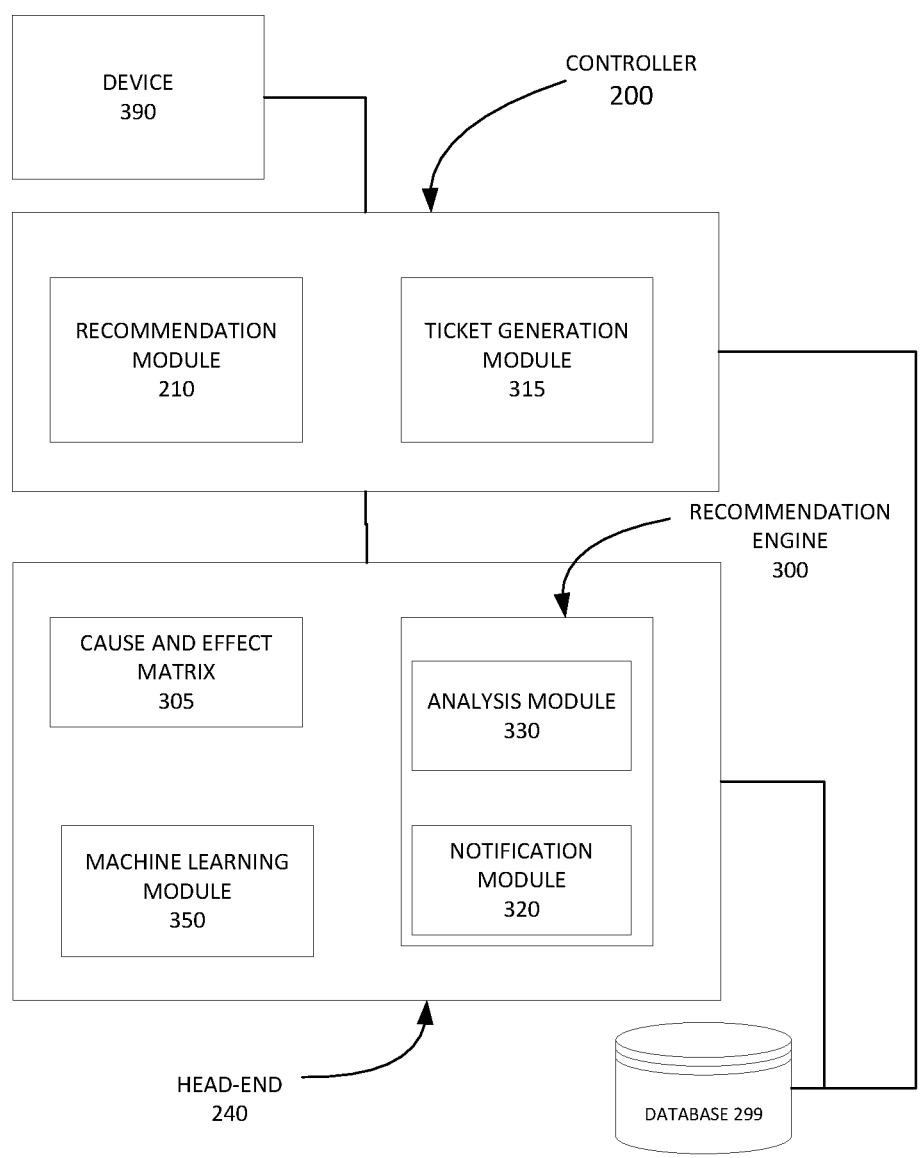
FIG. 3 is a diagram of an autonomous instrument management system according to another embodiment.

FIG. 3 illustrates another example of an autonomous instrument management system. In FIG. 3, the operation of the head-end 240 is described in more detail. FIG. 3 includes the controller 200, which is configured to monitor the state, condition, or other aspect of a device that can facilitate production or processing of at least one product or other material. The head-end 240 is configured to provide automated error-correction, service recommendations, and other functionality based on analytics provided by the head-end 240. In operation, the controller 200 monitors the device by continually receiving measurement data from the device and comparing the measurement data to a reference value. The measurement data is not limited to a specific device this. Instead, it can be any industrial apparatus (measurement device), like a gas-flow meter, a gas chromatograph, a temperature sensor, a pressure sensor, am ultrasonic transducer, or any suitable general purpose measuring device.

The measurement data can be stored in a database 299, or other suitable storage mechanism such as hardware, software, firmware, or any suitable combination of these.

When the measurement data and the reference values indicate that the device is operating out of range, or otherwise is in a state that requires some action, a ticket generation module 315 communicates with the head-end 240. The head-end 240 is configured to receive the communication from the ticket generation module 315 and to generate a ticket, which can be processed and utilize a recommendation engine 300. In one example, a new ticket number can be generated at the head-end 240, which can include with the ticket the details that were encapsulated in the package sent from the controller 200. The ticket number can be shared and stored at the head-end 240, for example it can be used to reference the ticket as it is processed through a traditional ticket processing system and until the problem is solved and the ticket is closed.

The recommendation engine 300 is configured to provide autonomous advice on solving the error that is happening in the device using an analysis module 330, shown here as device 390. The recommendation engine 300 is also configured to return a detailed report to the ticket generation module 315 using a notification module 320. The report can include, for example, all of the information relevant to the device like data log files, historical data, and recommendations. In one embodiment, the recommendation engine 300 can provide a most likely root cause and a most likely recommendations to solve this error situation back to the device. Both the most likely root cause and the most likely recommendations can be provided in clear text or other form to a user, device screen, or both. In another example, each recommendation has a calculated likelihood indicator between 0% and 100%. The recommendation with the highest likelihood, can be used by the recommendation engine 300 for the representation to the user, device screen, or elsewhere.

The communication from the head-end 240 can also be used by a machine learning module 350. The machine learning module 350 can perform machine learning using a cause and effect matrix 305, which can also be included in the head-end 240. The cause and effect matrix 305 can have a table of other data structure that pairs a cause of a problem with a solution to the problem. By utilizing the machine learning module 350 continually over time, the cause and effect matrix 305 can be updated, for example as better solutions are learned to existing problems. In this manner, the machine learning module 350 improves the cause and effect matrix 305 over time and this will in turn improve the performance of the controller 200, the recommendation module 210 and can be used to improve the solution data. In one example, automated feedback can be provided to the machine learning module 350 either from the ticket generation module 315 or another source. The automated feedback can include data associated with the actual field solutions for the device that can be used to update the cause and effect matrix 305, the recommendation engine 300, or both.

Figure 4:
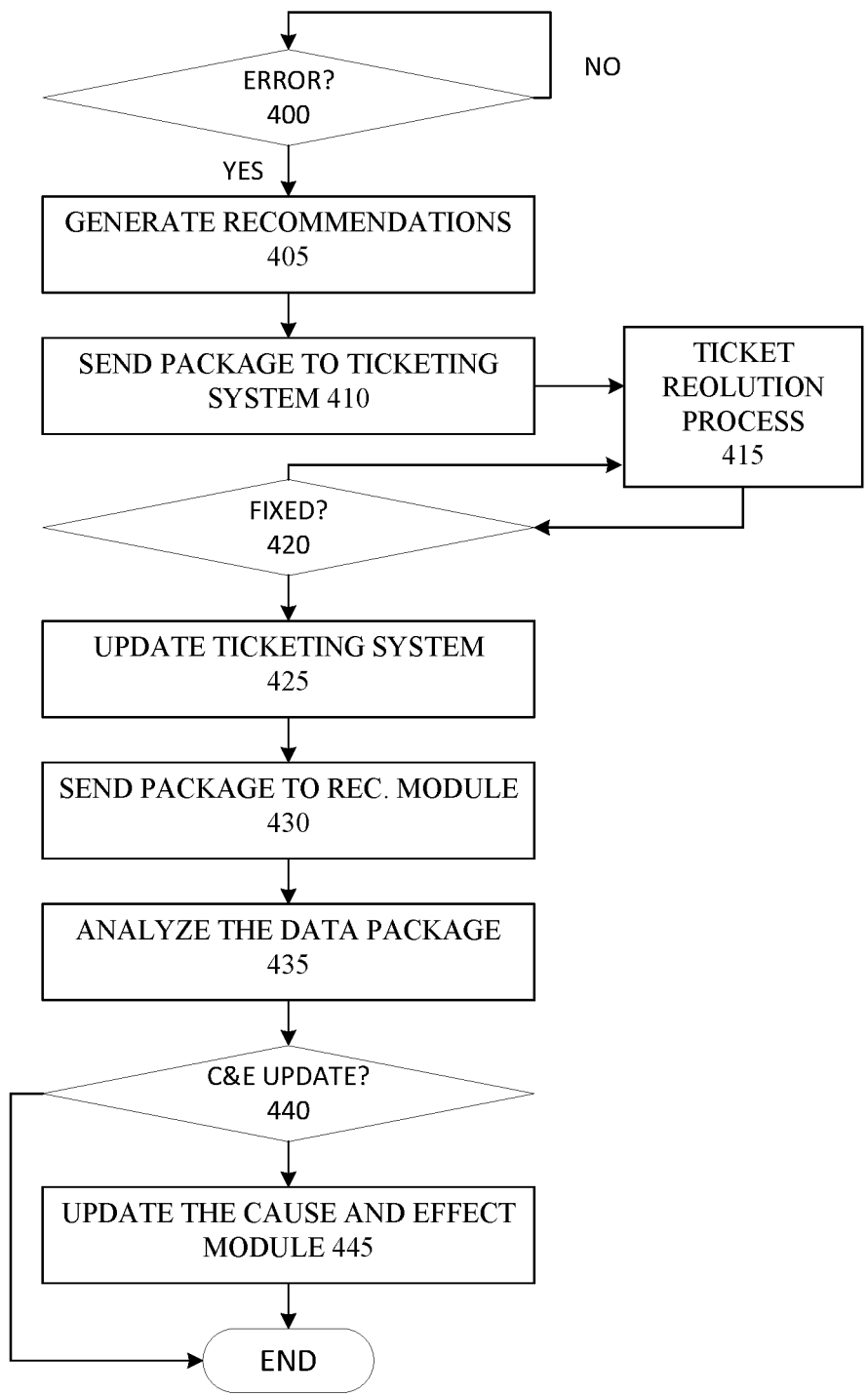
FIG. 4 is a flowchart that illustrates the operation of an autonomous instrument management system according to one embodiment.

FIG. 4 is a flowchart that illustrates the operation of an autonomous instrument management system according to one embodiment. At step 400, the system waits until there is an active error. When there is an active error, then at step 405, recommendations are generated. This could use a cause and effect module, for example. Thereafter, at step 410, a package is sent to a ticketing system. The package could include, for example, raw and/or historical data associated with the device that triggered the error state in step 400. In one example, the ticketing system will resolve the device problem associated with the package in one of two manners: 1. Autonomously adjusting of the device parameters; or 2. Human interaction is required. The system will seek to resolve the problem at step 415 by either sending the error- and root cause description to the user for manual intervention or it will autonomously solve the problem by adjusting the device remotely.

At step 420, the system determines if the error has been fixed. If not, there error resolution step repeats at step 415. When the error condition is fixed, the ticketing system is updated at step 425 and a data package is sent to a recommendation module at step 430. At step 435, the recommendation engine analyzes the data package. At step 440, the recommendation engine determines whether or not the cause and effect module needs to be updated. If not, the process ends. Otherwise, the cause and effect module is updated at step 445 and the process ends.

Figure 5:
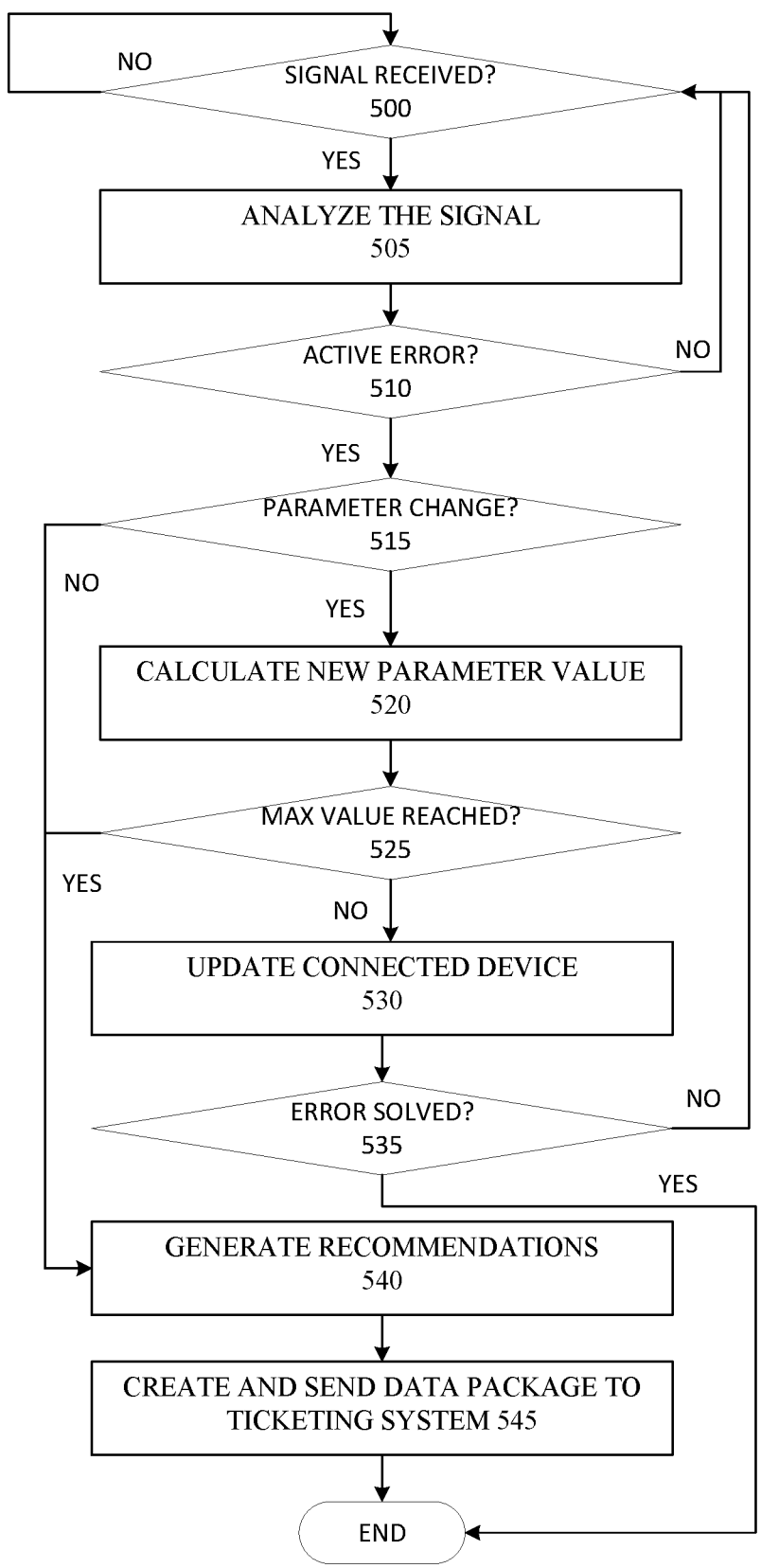
FIG. 5 is a flowchart that illustrates the operation of an autonomous instrument management system according to another embodiment.

FIG. 5 is a flowchart that illustrates the operation of an autonomous instrument management system according to another embodiment. At step 500, the system waits until there is a signal will be received. At step 505, the signal is analyzed. This signal can be sent, for example, when an ultrasonic transducer of a device is detected to be operating with a reduced accuracy. At step 510, the system determines whether there is an active error. If not, the system continues to wait at step 500. When the error occurs at step 510, the system determines whether a parameter change is possible at step 515. When a parameter change is not possible, the system generates recommendations at step 540 (e.g., using a cause and effect table) and a data package is created and sent to a ticketing system, for example, at step 545. Thereafter, the process ends.

When a parameter change is possible at step 515 a new parameter value can be calculated at step 520. In one example the parameter is changed gradually in a step-wise manner as described in further detail with respect to Table 1.

TABLE 1

| Parameter | Min Value | Max Value | Increment Step | Decrement Step |
|---|---|---|---|---|
| Parameter 1 | Data 1 | Data 2 | Data 3 | Data 4 |
| Parameter 2 | Data 5 | Data 6 | Data 7 | Data 8 |

At step 525, the system determines whether the current parameter value of the device is at a threshold where the system cannot increase it anymore. This could occur, for example, by comparing the max value in Table 1 for a given device and determining whether the current value is equal or greater to the max value. If the current parameter value at step 525 is not at a threshold where the system cannot increase it anymore, then the system updates the connected device at step 530. At step 535, the system determines whether the error is solved. If so, the process ends. Otherwise, the process repeats at step 500 and the system thereafter waits for an additional signal at step 500.

Table 1, and others, can be used to instruct the system on what values to use when doing a step-wise adjustment for a device. In another example, the cause and effect module includes weighting factors associated with each error or warning that originates from a device being monitored. Each factor can be rated on a scale from 0 to 10, for example, with 0 being of no influence and 10 indicating highly important for the outcome of the cause and effect module. Each possible error cause can also have a weighing factor on every possible error and warning. Each error cause can be rated, for example, on a scale from −10 to 10, with 0 being of no influence, −10 indicating high reduction of the impact and 10 indicating highly important for the outcome of the cause and effect module.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An instrument management device comprising:
 a first device comprising a circuitry; and a second device, wherein the circuitry is configured to:
 receive a signal from the second device based on a comparison between measurement data and a reference value, wherein the measurement data is compared to the reference value to indicate an error condition;
 generate one or more recommendations associated with the error condition by using a cause and effect table, the cause and effect table comprising a data structure having at least one row and at least one column, wherein the cause and effect table includes a weighting factor associated with each error that originates from the second device and a weighting factor associated with each possible error cause of each error, the first device accessing a data item from one of the rows or one of the columns of the cause and effect table;
 send the one or more recommendations including the data item, to obtain a resolution of the error condition by altering a state of the second device, and generate a data package associated with the resolution of the error condition;
 use the data package to determine whether to update the cause and effect table; and alter the data item in one of the rows or one of the columns based on a feedback to update the cause and effect table.

2. The device of claim 1, wherein the first device has a microprocessor and a memory.

3. The device of claim 2, wherein the measurement data is associated with a measuring device.

4. The device of claim 3, wherein the error condition indicates a specific error.

5. The device of claim 4, wherein the circuitry is further configured to determine using the cause and effect table whether the reference value is equal to an operating range for the measuring device.

6. The device of claim 5, wherein the cause and effect module is updated using the data package.

7. The device of claim 6, wherein the data item is updated via a loop which incrementally adjusts the data item until the first device no longer indicates a reduced accuracy error.

8. A system comprising:
an instrument management device that includes a first device comprising a circuitry; and a second device, wherein the circuitry is configured to:
receive a signal from the second device based on a comparison between measurement data and a reference value, wherein the measurement data is compared to the reference value to indicate an error condition;
generate one or more recommendations associated with the error condition by using a cause and effect table, the cause and effect table comprising a data structure having at least one row and at least one column, wherein the cause and effect table includes a weighting factor associated with each error that originates from the second device and a weighting factor associated with each possible error cause of each error, the first device accessing a data item from one of the rows or one of the columns of the cause and effect table;
send the one or more recommendations including the data item, to obtain a resolution of the error condition by altering a state of the second device, and generate a data package associated with the resolution of the error condition;
use the data package to determine whether to update the cause and effect table; and
alter the data item in one of the rows or one of the columns based on a feedback to update the cause and effect table.

9. The system of claim 8, wherein the first device has a microprocessor and a memory.

10. The system of claim 9, wherein the measurement data is associated with a measuring device.

11. The system of claim 10, wherein the error condition indicates a specific error.

12. The system of claim 11, wherein the circuitry is further configured to determine using the cause and effect table whether the reference value is equal to an operating range for the measuring device.

13. The system of claim 12, wherein the cause and effect module is updated by using the data package.

14. The system of claim 13, wherein the data item is updated via a loop which incrementally adjusts the data item until the first device no longer indicates a reduced accuracy error.

15. A method implemented using a circuitry, the method comprising:
obtaining measurement data from a device;
comparing the measurement data to a reference value;
determining an error condition based on a comparison between the measurement data and the reference data, receiving a signal in response the error condition;
generating, using a cause and effect table, one or more recommendations associated with the error condition, the cause and effect table comprising a data structure having at least one row and at least one column, wherein the cause and effect table includes a weighting factor associated with each error that originates from the second device and a weighting factor associated with each possible error cause of each error, the step of generating further comprising accessing a data item from one of the rows or one of the columns of the cause and effect table;
obtaining a resolution of the error condition by altering a state of the device;
generating a data package associated with the resolution of the error condition;
using the package to update the cause and effect table; and
altering the data item in one of the rows or one of the columns based on a feedback to update the cause and effect table.

16. The method of claim 15, wherein the step of using the package further comprises, determining whether the reference value is equal to an operating range for a second device associated with the device.

17. The method of claim 16, wherein the cause and effect module is updated using the data package.

18. The method of claim 17, wherein the step of modifying the cause and effect table comprises modifying one of the rows or one of the columns of the cause and effect table.

19. The method of claim 18 further comprising repeating using the package by incrementally adjusting the data item with a new reference value until the error condition is resolved.

* * * * *